United States Patent [19]

Lavallee

[11] Patent Number: 4,839,444
[45] Date of Patent: Jun. 13, 1989

[54] HIGH SOLIDS ENAMEL

[75] Inventor: Francois A. Lavallee, Fort Wayne, Ind.

[73] Assignee: Essex Group, Inc., Fort Wayne, Ind.

[21] Appl. No.: 159,624

[22] Filed: Feb. 23, 1988

Related U.S. Application Data

[63] Continuation-in-part of Ser. No. 947,293, Dec. 29, 1986, abandoned.

[51] Int. Cl.$^4$ ............................................. C08L 63/00
[52] U.S. Cl. .................................. 525/481; 523/427; 523/429; 525/489; 525/510; 525/512; 525/528; 525/930; 427/120; 428/375
[58] Field of Search ............... 525/481, 406, 930, 489, 525/510, 512, 528; 523/427, 429

[56] References Cited

U.S. PATENT DOCUMENTS

| | | | |
|---|---|---|---|
| 3,239,598 | 3/1966 | Olson et al. | 174/120 |
| 3,409,581 | 11/1968 | Hagan, Jr. | 525/481 |
| 3,922,465 | 11/1975 | Kawaguchi et al. | 428/383 |
| 3,960,983 | 6/1976 | Blank | 525/143 |
| 4,088,809 | 5/1978 | Elbling et al. | 428/379 |
| 4,098,740 | 7/1978 | Wallace | 260/29.6 |
| 4,163,826 | 8/1979 | Kawaguchi et al. | 423/371 |
| 4,215,174 | 7/1980 | Flowers | 428/375 |
| 4,222,802 | 9/1980 | Sakai et al. | 156/53 |
| 4,254,071 | 3/1981 | Flowers et al. | 264/102 |
| 4,272,310 | 6/1981 | Dudgeon | 156/172 |
| 4,277,534 | 7/1981 | Flowers | 428/379 |
| 4,362,263 | 12/1982 | Kwiecinski | 228/263 A |
| 4,375,528 | 3/1983 | Lange | 524/538 |
| 4,446,300 | 5/1984 | Mabrey et al. | 528/288 |
| 4,454,197 | 6/1984 | Laganis et al. | 428/379 |
| 4,526,912 | 7/1985 | Biorcio et al. | 523/456 |
| 4,578,312 | 3/1986 | Biorcio et al. | 428/336 |
| 4,620,032 | 10/1986 | Doerr | 562/483 |

*Primary Examiner*—Theodore E. Pertilla
*Attorney, Agent, or Firm*—R. Thomas Payne

[57] ABSTRACT

The invention discloses a high solids wire enamel having a surprisingly low viscosity. The enamel comprises a mixture of high molecular weight and low molecular weight linear hydroxy polyethers, a phenolic resin, an isocyanate and possibly a melamine. The resulting enamel has excellent flexibility and resistance to crazing.

8 Claims, 1 Drawing Sheet

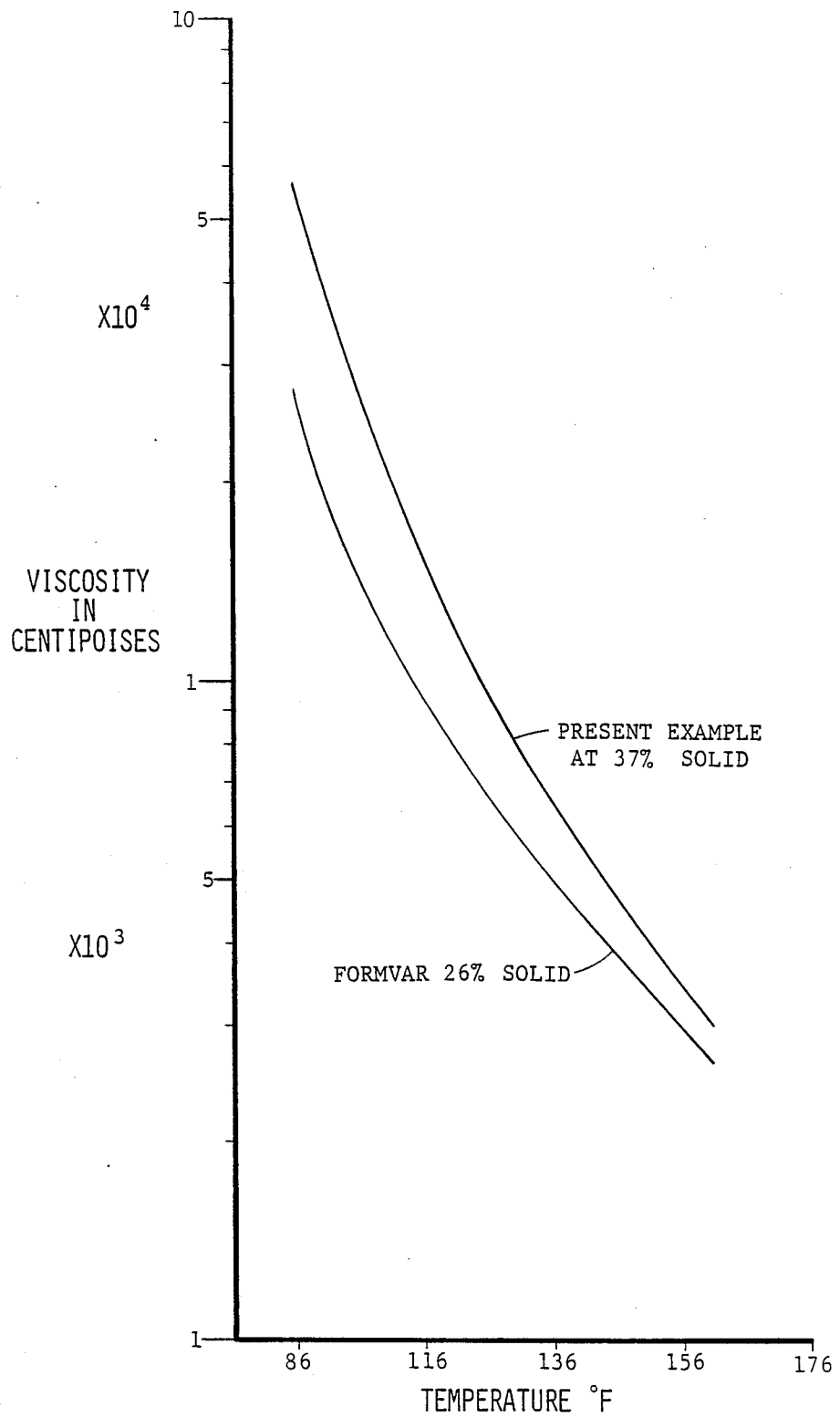

HIGH SOLIDS ENAMEL

CROSS REFERENCE TO RELATED APPLICATIONS

This is a Continuation-In-Part application of U.S. Ser. No. 947,293, filed Dec. 29, 1936, now abandoned, for HIGH SOLIDS ENAMEL by Francois A. Lavallee.

DESCRIPTION

Technical Field

This invention relates to wire insulating enamels in particular to electrical insulating enamels specifically designed for magnet wire.

BACKGROUND OF THE INVENTION

For many years wire manufacturers have been applying coatings to both electrically insulate and mechanically protect their products. Such insulation is of particular importance to the manufacturers of magnet wire due to the nature of the final product made using this wire, such as electrical transformers.

These insulating processes generally require that the bare wire substrate be contacted with the wet enamel coating, thereby covering the wire with a layer of the coating, thereby, covering the wire with a layer of the coating material. The thickness of the coating and concentricity about the wire are then assured by passing the coated wire through some type of die arrangement which removes the excess coating and conforms the coating to a proper thickness and uniformity about the wire. The solvents, which carry the enamel solids are then driven off and the enamel cured by passing the coated wire through an oven.

These enamel coatings, when applied to the wire substrates, are in the form of low solid solutions. Generally, the solutions contain about 10 to 25 percent by weight of the enamel solids in organic solvents.

The particular method of applying the enamel coating to the wire substrate offers a number of problems for enamel coating designers. Since the enamel coating solutions contain low solids it requires a number of passes through an enamel applicator to build the required coating to the desired thickness. These thicknesses may vary from about 1 mil or less to about 6 mils depending on wire diameter. Therefore, it would be advantageous to develop a coating with higher solids contents thereby permiting high build-ups with each pass of the wire through the die resulting in fewer passes to produce the desired build. It should be noted that not only would high solids enamels be more efficient, requiring fewer passes, but these solutions would require a lower concentration of organic solvents and therefore, would likely be lower in cost due to the fact that the organic solvents represent a major cost of these enamel solutions.

Another benefit from such enamel coatings would be in the form of environmental protection because with fewer passes of the wire through the enamel and less organic solvent being in the solution less of the organic solvents would be evaporated into the atmosphere during the enameling process.

However, the enamel coating designers are faced with a problem that when one increases the solids content of a given enamel the viscosity rises significantly. This makes application of the enamel to the wire substrate difficult to control to a uniform thickness and concentricity. In addition, any such enameling coating must be able to meet the industry standards and requirements for both electrical and physical properties of the finished wire products.

One compositions for high solids enamels is taught in U.S. Pat. No. 4,578,312 in which high molecular weight polyether are used to formulate an enamel. However, it has been found that such a resin system, once applied to the wire, undergoes crazing and is dielectrically unstable. In addition, due to the presence of all high molecular weight polymer, the ability to increase the solids is limited by the final viscosity resulting from these resins.

Therefore, what is needed in this art, is a wire enameling coating which has high solids content and yet a low viscosity at application temperatures which will allow for the production of a coated wire substrate having a uniform thickness and concentricity and meets all of the electrical and physical properties required of such wires in the industry and will reduce crazing and increase the dielectric stability of the final wire product.

DISCLOSURE OF THE INVENTION

The present invention discloses a high solids magnet wire enamel, having a mixture of high molecular weight and low molecular weight linear hydroxy polyethers. The particular invention utilizes linear hydroxy polyethers having a molecular weight range from about 5,000 to about 35,000 for the high molecular weight material while the low molecular weight material has a molecular weight of about 1800 to about 2500.

Further disclosed is a magnet wire coated with the enamel of the present invention.

Further disclosed is a method of coating a magnet wire with the enamel of the present invention.

As will be demonstrated, the unique feature of these enamel mixtures is that their solids content can be increased significantly without significant increases in their viscosities overcoming the problem associated with the prior art. Additionally, the resulting enamel is resistant to crazing and dielectrically stable.

Other features and advantages will be apparent from the specification and claims and from the accompanying drawings which illustrate an embodiment of the invention.

BRIEF DESCRIPTION OF THE DRAWINGS

The FIGURE is a viscosity curve of the present invention and the prior art enamel coatings.

Best Mode for Carrying Out the Invention

The epoxy resin used to practice this invention is a mixture of high and low molecular weight linear hydroxy polyethers. The high molecular weight polyethers should have a molecular weight of about 5,000 to about 35,000 with a preferred range of 18,000 to about 24,000 while the low molecular weight material should be about 1800 to about 2500. These limitations are important in order to achieve the desired viscosity levels of an enamel having the high solids concentrations desired and the desired wire properties.

The preferred linear hydroxy polyether resin systems are those based on the reaction of a bis-phenol A and an epichlorohydrin. These materials are available commercially as are their reactant products.

A number of desirable high molecular weight resins having the desired characteristics are available commercially such as PKHC; PKHJ, from Union Carbide, with the preferred epoxy resin also available from Union Carbide being PKHH. This particular polyether resin has a molecular weight of 18,000.

These high molecular weight hydroxy polyethers will typically have a formulation of

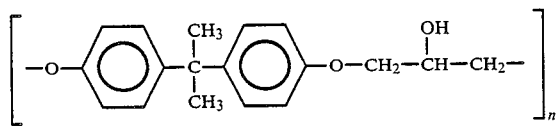

where n can be any number depending on the particular molecular weight desired. These materials will usually have an aromatic character as well as a secondary hydroxyl group.

The low molecular weight polyether may be of the same configuration as the high molecular weight material (where the n is a smaller number) or it could be a cycloaliphatic polyether. The more preferred and commonly available low molecular weight polyethers are available commercially from Dow Chemical Company as Dow 661, and Epi-Rez 510c available from Celanese Chemical Company.

The total polyether resins present in the formulated enamel will range from about 20 percent by weight to about 40 percent by weight. It is preferred that about 5 percent by weight to about 30 percent by weight of all of the polyethers present in the formulation be of low molecular weight material; with the preferred amount being about 15 percent to about 20 percent by weight and the high molecular weight ranging from about 70 percent to about 95 percent. It has been found that the presence of these low molecular weight polyethers results in enamel coatings with the improved flexibility upon application on the wire and reduced crazing of the enamel during use. Although Applicants do not wish to be bound by this particular interpretation, it is believed that the particular mixture of the high and low molecular weight materials is the critical aspect resulting in this unique enamel.

In addition to these linear hydroxy polyethers, other constituents are typically added in varying concentrations to give specific properties to the enamel. These materials are generally cross-linking agents and hardeners which aid in the curing of the enamel.

The cross-linking agents are conventional and would be those or a combination of those known in the industry to cure linear hydroxy polyethers of the type disclosed herein. Typically, these will be aliphatic or aromatic blocked polyisocyanates such a AP Stabil (available from the Mobay Corporation, Pittsburgh, PA) and P.D. George 107 (available from P.D. George Company, St. Louis, MO). Typically, these will be present in amounts ranging from about 1 percent to about 50 percent by weight of the solids with about 15 percent to about 35 percent by weight being perferred. Also, phenols, which are the reaction products of meta or para cresol and formaldehyde, are also useful as cross-linking agents and are often combined with the polyisocyanates. Typical commercial phenols which may be used with the present invention are General Electric's 73043 (50 percent phenolic); and Schenectady Chemical's 709 (40 percent phenolic). These materials will be used in their conventional concentrations of from about 1 percent to about 50 percent by weight of the solids with about 15 percent to about 35 percent by weight being perferred.

Additionally, other ingredients may be added to increase the hardness of the enamel. One type of ingredient are melamines. The preferred material is Resimene 881 from Monsanto Industrial Chemical Corporation, however, others may be used such as Cymel 301 from American Cyanamid Company. Typically, these materials are present in concentrations of about 0 percent to about 2 percent by weight and are preferably present in concentrations of about less than 1 percent by weight.

Typically, the hydroxy containing polyether is dissolved in one or more organic aromatic solvents such as cresylic acid, phenol, or high boiling aromatic hydrocarbon having a boiling point above 222.8° F. (160° C.). Although any solvent which is compatible with the resin, and any of the constituents which may be added, may also be used. The enamel is prepared by placing all of the constituents in a container and while agitating, heating the constituents to assist their dissolution in the solvents and the formation of a homogenous solution. Typically, this will require a temperature range of somewhere between 194° F. and 320° F. (90° C. and 160° C.) depending on the particular thermal reactivities of the constituents present. No particular sequence of addition is necessary. Once the solution is homogenous, it is generally filtered to remove any small impurities or particles and it is then ready to be applied to the wire.

Concentration of the resin solids in the solvent will vary, however, solids contents from about 15 percent to 50 percent may be prepared using these materials. The actual solids concentration and therefore the viscosity or the enamel will depend on the actual dies and enameling methods used to apply the enamel to the wire.

EXAMPLE

An enamel of the type contemplated by this invention was prepared as follows:

A mixture containing the following constituents was prepared:
- 515 grams of hydrocarbon solvent SC150 from the Shell Corporation
- 302 grams of cresylic acid
- 905 grams of phenol
- 866 grams of a high molecular weight (18000) polyether as PKHH available from Union Carbide Corporation
- 97 grams of a low molecular weight (2000) polyether as Epirez 530C available from Celanese Chemical Company
- 187 grams of AP Stabil a blocked isocyanate available from Mobay Chemical Corporation This mixture was placed in a 5 liter flask and heated to 194° F. (90° C.) and agitated for 1 hour. To the mixture was then added and additional cross-linking agent 601 grams of a 40 percent by weight cresylic acid solution of cresol formaldehyde (having a molecular weight of about 400) and heating at 194° F. (90° C.) continued for 2 more hours. The solution was allowed to cool overnight and in the morning was again heated, this time to 230° F. (110° C.) for an additional 2 hours, then the temperature was reduced to 140° F.–149° F. (60° C.–65° C.) and 5 grams of a flow control agent (Tetronic 130 R2 from BASF Corporation) was added and one-half hour later the solution was filtered at a temperature of 176° F. (80° C.).

The resulting enamel had a solids content of 37.1 percent by weight and had a remarkably low viscosity for enamels with high solids content of this magnitude at varying temperatures. (Although this example was allowed to cool overnight and then reheated, this is not a necessary procedure and was only done this way as a matter of convenience.)

As may be seen in the FIG., a graph of the present enamel compared to Formvar® (which is the present industry standard enamel) clearly shows that the viscosity of the present enamel at 37 percent is very close to the Formvar® material at some 11 percent lower solids. Therefore, enamels formulated by this invention can expect to have significantly lower viscosities than other enamels i.e. Formvar® at the same solids content. This allows the new enamels to be applied in conventional techniques yet at significantly higher solids contents resulting in a process which overcomes the problems set out in the "Background" section of this specification. It is highly desirable that enamels of this type having solids contents ranging from about 15 percent to about 50 percent by weight have viscosities in the range of 1500 centipoise to about 3500 centipoise at 160° F. (71.1° C.) or have the characteristic or having viscosities which fall within the viscosities at the enameling temperature of the particular enameling process. Additionally, these enamels have excellent flexibility and resistance to crazing.

While, the proces and product herein described constitute, preferred embodiments of the invention, it is to be understood that the invention is not limited to this precise process and product, and that changes may be made therein without departing from the scope of the invention which is defined in the appended claims.

I claim:

1. A high solids, low viscosity enamel resistant to both water and oil, for insulating magnet wire used in oil filled transformers consisting essentially of: a mixture of non-reactive high molecular weight and reactive low molecular weight linear hydroxy polyethers, a phenolic resin, an isocyanate and a melamine resin dissolved in an organic solvent wherein the phenolic resin is present at about 25 percent to about 50 percent by weight, the isocyanate is present at about 0 percent to about 20 percent by weight and the melamine is present at about 0.0 percent to about 2 percent by weight and the linear hydroxy polyethers are the balance by weight of the solids content of the resin, wherein said low molecular weight polyether acts as a cross-linking agent during the curing of said enamel on said wire and said enamel has a significantly lower viscosity at the same solids concentration as the present industry standard enamel.

2. The enamel of claim 1 wherein the low molecular weight polyethers comprise about 5 to about 30 percent by weight of hydroxy polyethers present in the enamel.

3. The enamel of claim 1 wherein the organic solvent is an aromatic hydrocarbon.

4. The enamel of claim 1 wherein the solids content is about 25 percent to about 40 percent by weight.

5. A high solids low viscosity enamel for insulating magnet wire used in oil filled transformers, said enamel consisting essentially of:

A mixture of a high molecular weight terminally non-reactive linear hydroxy polyether having a molecular weight from about 5,000 to about 35,000 and a low molecular weight terminally reactive linear hydroxy polyether having a molecular weight from about 1,800 to about 2,500, said mixture comprising about 20 to about 40 percent by weight of said enamel with said low molecular weight polyether comprising about 5 to about 30 percent by weight of said mixture of polyethers present in said enamel;

at least one cross-linking substance in an amount sufficient to effectuate sufficient cross-linking between said high and said low molecular weight polyethers during the curing of said enamel on said wire; and at least one hardening substances in an amount sufficient to effectuate hardening of said enamel during the curing of said enamel on said wire, said cured enamel having excellent resistance to crazing.

6. The enamel of claim 5 wherein said cured enamel on said wire exhibits improved flexibility.

7. The enamel of claim 5 further comprising: an aromatic hydrocarbon organic solvent.

8. The enamel of claim 5 wherein the solids content of said enamel is about 25 percent to about 40 percent by weight.

* * * * *